United States Patent [19]

Addison et al.

[11] 4,010,512
[45] Mar. 8, 1977

[54] SELF-CONTAINED RECEPTACLE TYPE DIP STICK CLEANER

[76] Inventors: F. Clark Addison; Lee Silk Addison, both of P.O. Box 2462, Estes Park, Colo. 80517

[22] Filed: Mar. 29, 1976

[21] Appl. No.: 671,120

[52] U.S. Cl. ............................................ 15/210 B
[51] Int. Cl.² ...................................... G01F 15/12
[58] Field of Search ............. 15/210 B; 33/126.7 R

[56] References Cited

UNITED STATES PATENTS 2,659,922 11/1953 Klein .................. 15/210 B
3,205,525 9/1965 Birtzer .................. 15/210 B

FOREIGN PATENTS OR APPLICATIONS 710,077 6/1954 United Kingdom ............. 15/210 B Primary Examiner—Edward L. Roberts
Attorney, Agent, or Firm—MacGregor and Rost

[57] ABSTRACT

A dip stick cleaning tool having a cylindrical body with flexible sides and removable ends. The body contains a core of absorbant, flame proofed, rolled material having an open center for receiving the dip stick. The top of the tool has an opening leading into the open center of the core and also has a pivotably mounted cover that acts with the side of the top opening to clean an inserted dip stick with squeegee action while the core wipes the dip stick and absorbs the wiped liquid. Inside the cylindrical body the core is spaced from the cylinder walls by a plurality of ribs to allow air to circulate around the core, and the core is spaced from the top of the tool by a plurality of pointed spurs to provide a space to hold liquid squeezed out of the core when the cylindrical body is squeezed while operating the tool.

8 Claims, 10 Drawing Figures

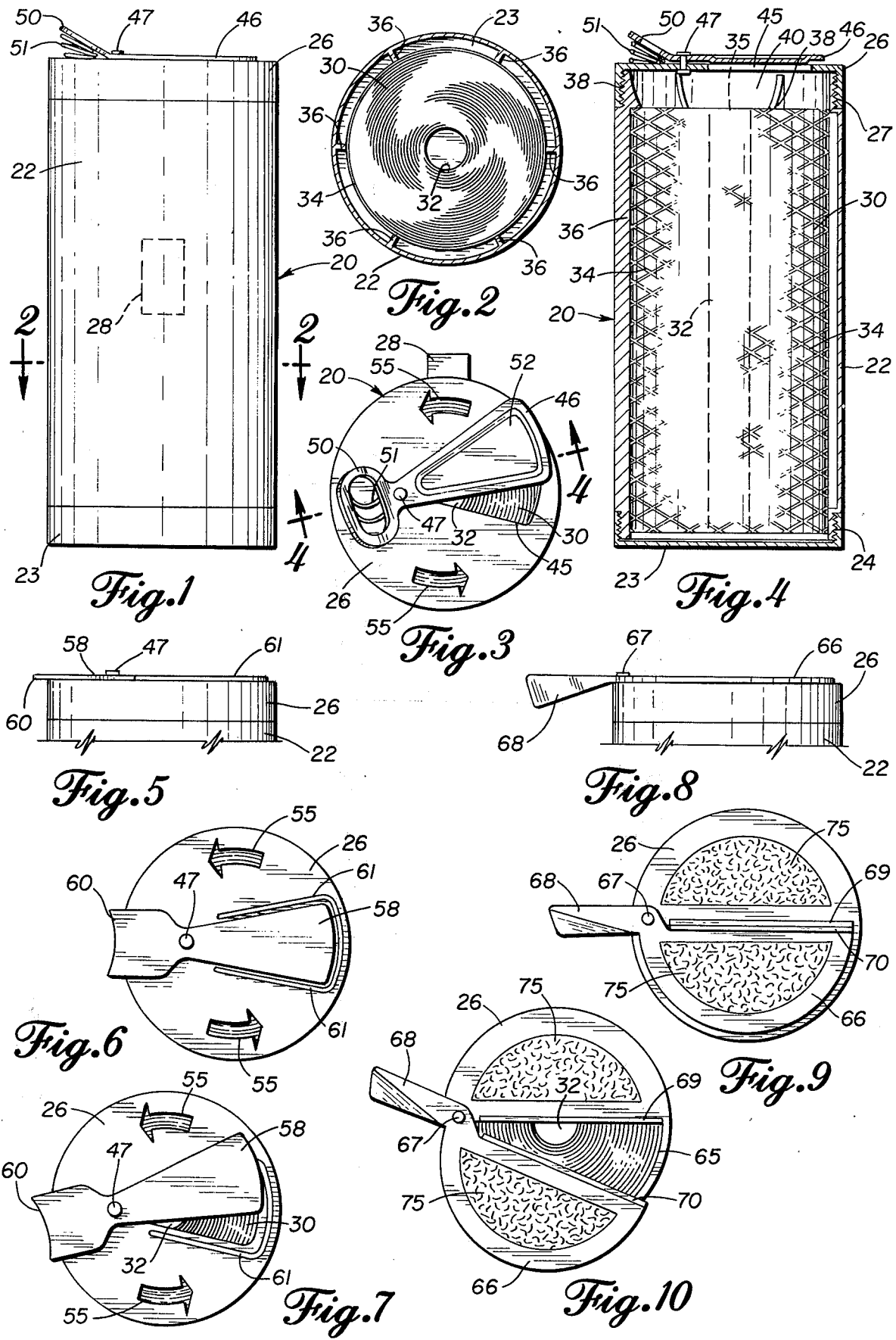

SELF-CONTAINED RECEPTACLE TYPE DIP STICK CLEANER

BACKGROUND OF THE INVENTION

1. Field of the Invention

The invention relates to dip stick cleaning tools. Dip sticks are used to measure fluid levels in automobile engines and the like and must usually be wiped clean before an accurate measure can be read. The present invention provides a tool that cleans the dip stick and retains the wiped oil in a replaceable core.

2. Description of the Prior Art

A variety of devices are known in the prior art that will remove oil or the like from a dip stick. Commonly used rags and paper towels, however, are messy and wasteful since the wiper is generally used only one time and thereafter is a source that can contaminate other surfaces it contacts. More sophisticated cleaning tools have comprised a pad or pair of pads in a casing through which the dip stick is drawn. Such devices make no provision for retaining the wiped oil other than such small amount as may be absorbed in the wiping pad and therefore remains a source for contaminating other objects. Some such devices have been mounted on the dip stick tube of an engine, thereby obviating the oil retention problem by dripping wiped oil back into the engine crankcase; however, this solution has two disadvantages. First, the cleaning tool requires a modification of the length or structure of the dip stick tube or dip stick, and second, the tool returns dirty oil to the engine and is a source of accumulated dirt and sludge over a period of prolonged use.

Dip stick wipers that attempt to internally store the wiped oil must prevent leakage and have provision for emptying the storage area. In addition, if volatile liquids are wiped in a tool that retains the liquid, provision for avoiding spontaneous combustion is needed. No presently known cleaning tool has overcome the combined problems of sealing a reservoir against spills if tipped and venting the reservoir to prevent spontaneous combustion.

Other problems seen with prior art devices include impractical openings for the dip stick and directional openings for the dip stick. Both problems are exemplified by cleaning tools with a narrow slit through which the dip stick is to be inserted. Many dip sticks are both long and flexible, making precise insertion through a slit impractical and clumsy. Often the user must hold the dip stick close to the measuring end in order to make such an insertion, soiling his hands and otherwise obviating the advantages sought with such a tool.

The present invention seeks to overcome all of the mentioned problems through practical construction utilizing a replaceable wiping core, a broadly opening lid that both applies squeegee action to the dip stick being wiped and tightly seals the reservoir of the tool between uses, and vents to the reservoir that will not leak the stored liquid.

SUMMARY OF THE INVENTION

A dip stick cleaning tool has a core of absorbent material for wiping a dip stick and holding the removed liquid. The core is retained in a flexible container with spaces between the core and container for preventing overflow of absorbed liquid if the container is squeezed. The container has a lid with a portion that pivots open to expose an opening in the core for insertion of a dip stick. The opening portion of the lid and the nonopening portion have a lip that assists in sealing the lid when closed and applies squeegee action to a dip stick inserted when the lid is open. Vents, which may be covered with a permeable material, prevent spontaneous combustion of retained liquid in the core.

An object of the invention is to provide a dip stick cleaning tool minimizing the danger of spilling accumulated wiped liquids while retaining the liquids in the tool. The absorbent core of this tool occupies the majority of the interior space and both wipes the dip stick and retains the wiped liquid. Tools having a simple reservoir under a wiping means can spill accumulated liquids if the tool is left on its side, for example, and the liquid soaks through the wiping means and out of the tool. Free liquid is not generally present in the present invention. Free liquid is not generally found in the present invention, but when the core is saturated, it may be replaced with ease.

Another object is to clean dip sticks with a combination of wiping action and squeegee action. Prior art devices use a single wiping means to repeatedly clean dip sticks, allowing an accumulation of dirt that can contaminate the dip stick. By wiping the dip stick in the core of the present invention and then cleaning it with squeegee action, the tool cleans dip sticks even when the core contains a substantial amount of dirt. The tool remains efficient throughout the life of the core and does not encourage users to replace the core before it is saturated merely to obtain a clean wiping surface.

Another important object is to create a tool that has an easily replaceable core. The removable top and bottom of the tool make replacement of the core a neat and fast job. A net surrounds the core to hold it together and make handling of a new core easy.

A further object is to prevent spontaneous combustion in a dip stick cleaning tool. Vents in the top of the tool and air spaces surrounding the tool allow flammable vapor to escape from the confined area in the tool, reducing the chance of fire.

A further important object is to create a tool that does not require careful orientation of the dip stick before it can be inserted in the tool. When the top opening is exposed, it is large enough to allow a dip stick to enter the tool through a variety of angles. When the dip stick is inserted, it is simple to properly orient it to apply squeegee cleaning.

BRIEF DESCRIPTION OF THE DRAWINGS

FIG. 1 is an elevational view of the tool in a first embodiment.

FIG. 2 is a top view of the embodiment shown in FIG. 1.

FIG. 3 is a view similar to FIG. 2 and showing the cover open and revealing a portion of the core.

FIG. 4 is a vertical sectional view along the plane of line 4—4 of FIG. 2.

FIG. 5 is an elevational view of the upper part of a second embodiment of the tool, having a modified cover.

FIG. 6 is a top view of the tool shown in FIG. 5.

FIG. 7 is a view similar to FIG. 6, showing the modified cover in an open position.

FIG. 8 is an elevational view of the upper part of a third embodiment of the tool, having a modified cover.

FIG. 9 is a top view of the modified cover shown in FIG. 8.

FIG. 10 is a view similar to FIG. 9, showing the modified cover in open position.

DESCRIPTION OF THE PREFERRED EMBODIMENT

The dip stick cleaning tool 20 as shown in the drawings has a cylindrical body 22 enclosed at its lower end by bottom 23, which may be removable at threads 24. The upper end of cylinder 22 is closed by top 26, which may be removable at threads 27. A magnet 28 may be attached to cylindrical body 22 to provide convenient mounting of the tool 20 on any ferrous surface. Cylinder 22 may be constructed of flexible material such as a plastic to allow the cylinder to be squeezed. A preferred size is approximately two by four inches.

Tool 20 contains a core 30 of absorbent material for cleaning a dip stick and retaining the wiped liquid. Core 30 may be of rolled, absorbent, flame-proofed material having a lengthwise open center 32 along its central axis, and may be cased in a net 34 that does not cover the upper opening 35 of open center 32. Net 34 maintains the shape of core 30, and simplifies removal and replacement of the core. The interior of cylinder 22 has a plurality of vertically extending ribs 36, for example six, extending inwardly from the cylinder wall. Each rib 36 has a small triangularly shaped spur 38 pointing inwardly near its top, for example one-half inch from the top of the cylinder 22. These pointed spurs 38 act as retaining means preventing core 30 from entering space 40 at the top end of cylinder 22, and their shape allows a replacement core 30 to be pushed downwardly from the top end of cylinder 22 until the top edge of the new core 30 is engaged under spurs 38.

Top 26 may have one of several modified forms shown in the drawings. In FIG. 2 and 3, top 26 has opening 45 and pivotally mounted cover 46. Cover 46 resembles a pull-ring as found on beverage cans, but it is held to top 26 by pivot pin 47 and pivots in a plane generally parallel to the upper surface of top 26 to open or close opening 45. Cover 46 may be bent slightly in the area where pivot pin 47 passes through the cover, raising the ring area 50 for easy finger operation. Resilient means such as spring 51 may be attached to cover 46 to prompt the cover into closed position as shown in FIG. 2. In addition, cover 46 may have a downwardly indented area 52 shaped to fit snugly into opening 45. Spring 51 holds the indented area 52 in opening 45 and must be overcome by downward pressure by the user to raise the indented area from opening 45 before pivoting cover 46 into the open position shown in FIG. 3. Spring 51 may assist both in pivoting cover 46 over opening 45 and in seating the identation 52 in the opening.

Vents 55 in top 26 allow fumes from liquids wiped with the tool 20 to escape from the tool, thereby eliminating danger of spontaneous combustion. The vents may be shaped to look like arrows indicating the proper direction to pivot cover 46 when opening the tool. The vents 55 may be covered with a permeable material such as a plastic or rubber foam to keep dirt out of the tool. Leakage from within the tool through the vents is prevented by having the wiped material absorbed in core 30.

A modified cover 58 is shown in FIG. 5–7 with identical numbers indicating those parts already described. Cover 58 is similar to cover 46 already described but is not bent at the area containing pivot pin 47. In addition, cover 58 is manually opened and closed without aid from resilient means. In place of ring area 50, this version has a thumb hold 60 that may extend beyond the circumference of top 26 to provide an easily operated lever for opening and closing cover 58. A rib 61 partially surrounding opening 45 assists in tightly sealing the opening when cover 58 is closed.

Another modified form of top 26 has a semi-circular opening 65 and a semi-circular cover 66 pivotally mounted on top 26 by pivot pin 67. Thumb lever 68 extends beyond the circumference of top 26 to provide a convenient means for opening and closing cover 66. Opening 65 may be edged with a strip 69 of flexible resilient material such as neoprene to create a seal with cover 66 when in closed position as seen in FIG. 9. In addition, cover 66 may have a strip 70 of flexible material along straight edge 71 to assist in sealing the tool when the cover 66 is closed and to work in cooperation with strip 69 to apply squeegee action for cleaning a dip stick. Vents 75 with foam covers are similar to those already described.

In operation, the tool 20 is held in one hand and the cover pivoted open. With the other hand, the user inserts a dip stick through the opening in top 26 and through open center 32 of core 30 until the dip stick strikes the bottom 23 of the tool. The user then gently squeezes the walls of cylinder 22, forcing the core 30 to contact the dip stick. The cover in any of the disclosed versions may be partially closed to a point where it contacts the dip stick, holding the dip stick between the edge of the cover and the edge of the opening in top 26. The dip stick is withdrawn from the tool 20 and is cleaned by both the wiping action of the core 30 and the squeegee action of the cover edge and opening edge acting in cooperation.

The wiped liquid is retained in core 30, thereby presenting no spillage danger. Even when core 30 is almost saturated, no liquid will be forced out of the tool 20 when the core is squeezed because space 40 allows room for retaining the excess liquid. In addition, core 30 has space between its outer circumference and the inside of cylinder 22 preserved by ribs 36. Air can circulate through the vents in top 26 and through the spaces around core 30 and through its center to prevent spontaneous combustion.

When the core is saturated, it may be replaced without messy handling by removing the top 26 and bottom 23 and inserting a new core from the top. The new core is pushed past spurs 38, thereby forcing the old core out of the tool from the bottom. Net 34 prevents the rolled material of both the new and old core from unrolling, making the core replacement a clean and easy job.

We claim:

1. A self-contained receptacle type dip stick cleaner comprising
   a. a flexible cylindrical body, having upper and lower open ends,
   b. a core of absorbent material contained within said body and having an open center along its vertical axis,
   c. a removable bottom closing the lower end of said body,
   d. a removable top closing the upper end of said body, said top having an opening exposing the open center axis of said core and having a pivotable cover for the top opening, and e. retaining means for holding said core at a predetermined distance from said top, creating an air space allowing the tool to be squeezed without forcing absorbed liquid from said core out of the tool.

2. The tool of claim 1, further comprising a plurality of inwardly extending ridges in said cylindrical body spacing said core from the cylindrical walls of the body, and a vent in said top allowing circulation of air in the tool and preventing spontaneous combustion.

3. The tool of claim 1, wherein said top further comprises resilient means urging the cover over the top opening.

4. The tool of claim 1, wherein said top further comprises a flexible edge on said cover and on said top opening for applying squeegee action to a dip stick being cleaned and for tightly sealing the top opening when the cover is closing said opening.

5. The tool of claim 1, wherein said core further comprises a net around portions of the core material for holding the material together and making removal and replacement of the core a clean job.

6. The tool of claim 1, further comprising magnetic mounting means attached to said cylindrical body for attaching the tool to ferrous surfaces.

7. The tool of claim 1, wherein said top further comprises a thumb operable lever attached to said cover for opening and closing said top opening and allowing the tool to be operated with one hand.

8. A self-contained receptacle type dip stick cleaner comprising
a. a flexible cylindrical body having an upper open end,
b. a core of absorbent material contained within said body and having an open center along its vertical axis,
c. a removable top closing the upper end of said body, said top having an opening exposing the open center axis of said core and having a pivotal cover for the top opening, and
d. retaining means for holding said core at a predetermined distance from said top, creating an air space allowing the tool to be squeezed without forcing absorbed liquid from said core out of the tool.

* * * * *